United States Patent
Drumm

(10) Patent No.: US 12,469,437 B2
(45) Date of Patent: Nov. 11, 2025

(54) ENCODING AND RECOGNIZING POSITIONS OF A DISPLAY

(71) Applicant: GOOGLE LLC, Mountain View, CA (US)

(72) Inventor: Owen Drumm, Dublin (IE)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 18/685,580

(22) PCT Filed: Sep. 15, 2022

(86) PCT No.: PCT/US2022/043667
§ 371 (c)(1),
(2) Date: Feb. 22, 2024

(87) PCT Pub. No.: WO2023/043928
PCT Pub. Date: Mar. 23, 2023

(65) Prior Publication Data
US 2024/0355273 A1  Oct. 24, 2024

Related U.S. Application Data

(60) Provisional application No. 63/245,593, filed on Sep. 17, 2021.

(51) Int. Cl.
*G09G 3/36* (2006.01)
*G09G 3/32* (2016.01)
*G09G 5/36* (2006.01)

(52) U.S. Cl.
CPC ............ *G09G 3/32* (2013.01); *G09G 3/36* (2013.01); *G09G 5/36* (2013.01); *G09G 2360/145* (2013.01)

(58) Field of Classification Search
CPC ...... G09G 5/36; G09G 2360/145; G09G 3/32; G09G 3/36
See application file for complete search history.

(56) References Cited

U.S. PATENT DOCUMENTS

| 5,442,147 A | 8/1995 | Burns et al. |
| 6,078,312 A | 6/2000 | Liebenow |

(Continued)

FOREIGN PATENT DOCUMENTS

| DE | 102011086318 A1 * | 5/2013 | ........... G06F 3/0321 |
| EP | 2479650 B1 * | 9/2015 | ........... G06F 3/0317 |

(Continued)

OTHER PUBLICATIONS

International Preliminary Report on Patentability in International Appln. No. PCT/US2022/043667, mailed on Mar. 28, 2024, 7 pages.

(Continued)

*Primary Examiner* — Ricardo Osorio
(74) *Attorney, Agent, or Firm* — Fish & Richardson P.C.

(57) ABSTRACT

In general, the subject matter described in this disclosure can be embodied in methods, systems, and program products for determining a position of a display at which a light receiving device is oriented. The method includes capturing, by the light receiving device, light transmitted by the display, wherein the display is configured to emit a plurality of different codes from a respective plurality of different regions of the display, such that each region of the plurality of different regions emits a unique code from among the plurality of different codes. The method includes identifying, by a computing system, a first code encoded within the light transmitted by the display and captured by the light receiving device. The method includes determining, by the computing system, a first region of the display that corresponds to the first code from among the plurality of different regions of the display.

12 Claims, 8 Drawing Sheets

(56) References Cited

U.S. PATENT DOCUMENTS

| | | | |
|---|---|---|---|
| 7,728,914 B2 * | 6/2010 | Tseng | G02F 1/133553 |
| | | | 345/173 |
| 8,576,159 B2 | 11/2013 | Cho et al. | |
| 9,035,911 B2 * | 5/2015 | Geaghan | G06F 1/32 |
| | | | 345/175 |
| 9,035,912 B2 * | 5/2015 | Taylor | G09G 3/342 |
| | | | 345/175 |
| 9,129,565 B2 | 9/2015 | Wei et al. | |
| 9,292,131 B2 * | 3/2016 | Geaghan | G06F 3/042 |
| 9,459,696 B2 | 10/2016 | Jiang et al. | |
| 9,958,954 B2 | 5/2018 | Geahgan | |
| 10,297,211 B1 * | 5/2019 | Novoselov | G02B 26/005 |
| 10,649,713 B1 * | 5/2020 | Liu | G09G 5/02 |
| 10,976,543 B1 | 4/2021 | Cho et al. | |
| 2005/0162401 A1 * | 7/2005 | Tseng | G06F 3/042 |
| | | | 345/173 |
| 2006/0087497 A1 | 4/2006 | Borgaonkar et al. | |
| 2007/0001950 A1 | 1/2007 | Zhang et al. | |
| 2007/0176851 A1 * | 8/2007 | Willey | G03B 21/142 |
| | | | 345/32 |
| 2009/0078475 A1 | 3/2009 | Ericson et al. | |
| 2009/0177416 A1 | 7/2009 | Nilsagard et al. | |
| 2012/0206349 A1 | 8/2012 | Nowatzyk et al. | |
| 2013/0016527 A1 * | 1/2013 | Geahgan | G06F 3/0386 |
| | | | 362/615 |
| 2013/0135219 A1 | 5/2013 | Yin et al. | |
| 2014/0348379 A1 | 11/2014 | Kraegeloh et al. | |

FOREIGN PATENT DOCUMENTS

| | | | |
|---|---|---|---|
| JP | 2006277492 A * | 10/2006 | |
| JP | 4774716 B2 * | 9/2011 | |
| JP | 6146635 B2 * | 6/2017 | |
| TW | 201911019 | 3/2019 | |
| WO | WO 2000070551 | 11/2000 | |

OTHER PUBLICATIONS

International Search Report and Written Opinion in International Appln. No. PCT/US2022/043667, mailed on Jan. 9, 2023, 14 pages.

Li et al., "Gesture Interaction in Virtual Reality" Virtual Reality and Intelligent Hardware, Feb. 2019, 84-112.

Tycotouch.com [online], "Magic Touch 23 inch add-on infrared touch frame with tempered glass, 236GR6" Jul. 2021, retrieved on Aug. 27, 2024, retrieved from URL <https://tycotouch.com/products/23-inch-magic-touch-screen-overlay-kit>, 5 pages.

Wacom.com [online], "Wacom for a creative world" Nov. 2014, retrieved on Aug. 27, 2024, retrieved from URL <https://www.wacom.com/en-us>, 1 page.

* cited by examiner

X Ordinate Modulation Codes

Y Ordinate Modulation Codes

ENCODING AND RECOGNIZING POSITIONS OF A DISPLAY

CROSS-REFERENCE TO RELATED APPLICATIONS

This application is a US 371 National Phase from PCT/US2022/043667 filed Sep. 15, 2022, which claims the benefit of priority to U.S. Provisional Application Ser. No. 63/245,593, filed Sep. 17, 2021, the entireties of which are incorporated herein by reference.

TECHNICAL FIELD

This document generally relates to encoding and recognizing positions of a display.

BACKGROUND

The ability to interactively draw and/or annotate a display device increases the utility of the display device by making the display device interactive. Adding such capabilities to large displays can involve added cost, hindering widespread implementation of displays that include input interfaces and the interactive functionality that comes therewith. Conventional pen sensor technology generally requires that input interface technology be integrated into a display device at its manufacture. It can be difficult to add pen tracking technology to a display device after manufacture. Aftermarket sensors may be unsightly, inconvenient to install, and subject to poor alignment with the display device.

SUMMARY

This document describes techniques, methods, systems, and other mechanisms for encoding and recognizing positions of a display.

Particular implementations can, in certain instances, realize one or more of the following advantages. Users may be able to interact with a display device, for example, by writing on the display device with a pen device or selecting an item presented by the display device using the pen device. Such functionality can be implemented in a display device without adding hardware to existing display devices or designs for display devices. For example, a display device need not include a touch sensitive layer to provide user input functionality. Rather, an existing display device controller (a small computer that controls display device operation) can be programmed to modify signals transmitted to an array of light-emitting diodes (LEDs) that provide a backlight or visual content, so that different regions of the array of LEDs emit different patterns of pulses. A user-held pen device with light sensors can detect these pulses and derive therefrom a position/orientation of the pen device with respect to the display device. The pulses may not be visible to users. The ability of a user to interact with specific portions of a display device significantly increases the ability of the user to interact with display device.

As additional description to the embodiments described below, the present disclosure describes the following embodiments.

Embodiment 1 is a computer-implemented method to determine a position of a display at which a light receiving device is oriented, comprising: capturing, by the light receiving device, light transmitted by the display, wherein the display is configured to emit a plurality of different codes from a respective plurality of different regions of the display, such that each region of the plurality of different regions emits a unique code from among the plurality of different codes; identifying, by a computing system, a first code encoded within the light transmitted by the display and captured by the light receiving device; and determining, by the computing system, a first region of the display that corresponds to the first code from among the plurality of different regions of the display.

Embodiment 2 is the computer-implemented method of embodiment 1, comprising: identifying, by the computing system, a second code encoded within the light transmitted by the display and captured by the light receiving device; and determining, by the computing system, a second region of the display that corresponds to the second code from among the plurality of different regions of the display.

Embodiment 3 is the computer-implemented method of embodiment 2, comprising: identifying, by the computing system, a first intensity of the first code; identifying, by the computing system, a second intensity of the second code; determining, by the computing system, the position of the display at which the light receiving device is oriented based on a comparison of the first intensity of the first code with respect to the second intensity of the second code.

Embodiment 4 is the computer-implemented method of embodiment 3, wherein: the first code is produced by a first group of one or more light emitting diodes (LEDs) of a backlight of the display; the second code is produced by a second group of one or more LEDs of the backlight of the display; a liquid crystal display (LCD) panel covers the backlight of the display; and the method comprises, before determining the position of the display at which the light receiving device is oriented based on the comparison of the first intensity of the first code with respect to the second intensity of the second code: weighting the first intensity of the first code based on an intensity of LCD elements within the first region of the display, the LCD elements within the first region of the display covering the first group of one or more LEDs of the backlight; and weighting the second intensity of the second code based on an intensity of LCD elements within the second region of the display, the LCD elements within the second region of the display covering the second group of one or more LEDs of the backlight.

Embodiment 5 is the computer-implemented method of embodiment 3 or 4, wherein: the light that encodes the first code and the second code is light transmitted during a single frame of display backlight modulation; and the first code and the second code overlap in time.

Embodiment 6 is the computer-implemented method of any one of embodiments 3 to 5, wherein: a single photodetector of the light receiving device captured the light that encodes both the first code and the second code.

Embodiment 7 is the computer-implemented method of any one of embodiments 3 to 6, wherein: the computing system determines the position of the display at which the light receiving device is oriented using data from an accelerometer that indicates a direction in which the light receiving device has been moving.

Embodiment 8 is the computer-implemented method of any one of embodiments 3 to 7, comprising: transmitting, by the computing system, information to cause the display to present graphical content at the position of the display at which the light receiving device is oriented, to indicate selection by the light receiving device of the position of the display.

Embodiment 9 is the computer-implemented method of any one of embodiments 3 to 8, wherein: the first code includes a first pulse that identifies a first X-position of the display and a second pulse that identifies a first Y-position of the display; and the second code includes a third pulse that identifies a second X-position of the display and a fourth pulse that identifies a second Y-position of the display.

Embodiment 10 is the computer-implemented method of embodiment 9, wherein: a starting location of the first pulse identifies the first X-position of the display; a starting location of the second pulse identifies the first Y-position of the display; a starting location of the third pulse identifies the second X-position of the display; and a starting location of the fourth pulse identifies the second Y-position of the display.

Embodiment 11 is the computer-implemented method of any one of embodiments 3 to 9, wherein: the first code includes a first serial pattern of pulses; and the second code includes a second serial pattern of pulses.

Embodiment 12 is the computer-implemented method of any preceding embodiment, comprising: outputting, by the display, the plurality of different codes from the respective plurality of different regions of the display, including: a first group of one or more light emitting diodes (LEDs) transmitting the first code as a first serial pattern of pulses during each frame of a sequence of frames; and a second group of one or more LEDs transmitting the second code as a second serial pattern of pulses, the second group of one or more LEDs being distinct from the first group of LEDs during each frame of the sequence of frames.

Embodiment 13 is directed to a computing system, comprising: one or more processors; and one or more computer-readable devices including instructions that, when executed by the one or more processors, cause the computing system to perform the method of any preceding claim.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
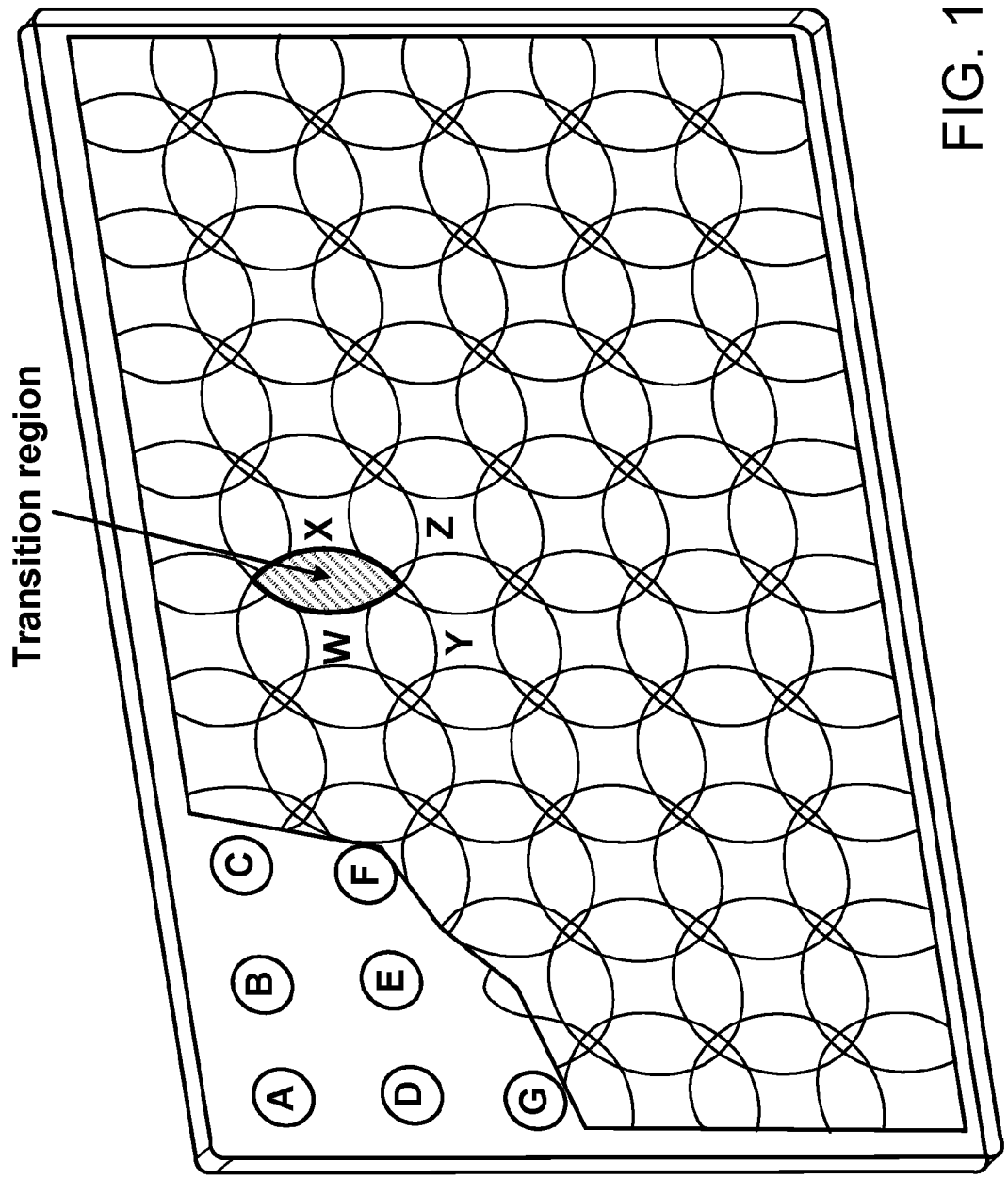
FIG. 1 shows an example of a display device that includes multiple backlight regions that can be independently controlled.

This document generally describes encoding and recognizing positions of a display. For example, a display may be configured so that each portion of the display transmits a light pattern that encodes that portion's respective position. In some examples, each portion of the display includes a group of one or more LEDs (e.g., backlight LEDs) that transmit that portion's respective code. The transmitted light pattern may not be visible to humans, and instead is detectable by computerized sensing devices, such as a handheld wireless pen device. Such a pen device can decode received light to identify a position of the display that emitted the received light, and transmit the identified position directly or indirectly to the display, for example, to cause the display to show a line that is being drawn by a user that is waving the pen device in the air.

Liquid crystal display modules (LCMs) make up a majority of displays that have a diagonal dimension of more than 8 inches. LCMs with backlights that offer local backlight dimming control have become widely available. Backlights in such displays are not restricted to providing equal illumination across the entire display, but can be controllably adjusted to reduce the display brightness in certain regions of the display (e.g., to make dark areas darker). Such selective backlight control improves the display contrast and also reduces the mean power dissipation of the backlight, because only bright parts of the image are fully illuminated.

Local control over backlight intensity can be applied to determine the location of a sensing instrument with respect to the display (e.g., a pen manipulated by a user over a surface of the display). By modulating different backlight regions with different modulation patterns, the light provided by a point of the display surface encodes the location of that point of the display surface.

Backlights are often constructed using LEDs, which have fast response times, and the desired illumination level is often adjusted by changing the duty cycle of the backlight regions using Pulse Width Modulation or related modulation methods (e.g., by setting the ratio of time the LEDs are emitting to the time they are not emitting). Modulation of backlight LEDs is applied at a rate which is higher than the critical fusion frequency of human vision, so that a change in modulation scheme is perceived by humans as a change in brightness in distinction to a change in the modulation pattern. Typical backlight modulation frequencies range from 80 Hz to 10 KHz.

Since a human observer is only aware of the integrated energy in the display output over the response time of the human eye (e.g., tens of milliseconds), the backlight modulation can encode supplementary information while maintaining the intended perceived brightness. The encoded information is detectable to light sensing instruments that operate with faster response times than the human eye, and with the means to decode this supplementary data stream. While human vision is sensitive to energy in modulated light (perceived as brightness), human vision is insensitive to the phase and frequency of that modulation as long as the modulation frequency is above the critical fusion frequency of the eye. Electronic photo-detection systems can be configured to be sensitive to phase and frequency (and insensitive to the energy content of) incident light, so that the human perception of the display image and the encoding of machine-readable data can be separate and need not disturb one another.

FIG. 1 shows an example of a display that includes multiple backlight regions that can be independently controlled. For example, items A-G represent independently controllable groups of LED backlights (e.g., with each group including an 8×16 collection of LEDs). Light from a backlight LED group that has propagated through a diffusion system can spread to emit a corresponding backlight region of the display at which light from a corresponding backlight LED group is detectable. In FIG. 1, some such LED backlight regions are labelled as regions W-Z. Some regions of a display may output light from multiple backlight LED regions. An example such region is shaded in FIG. 1 and labelled as a transition region, because the identified region emits light from multiple backlight LED groups.

A suitably equipped pen or other receiving instrument positioned to receive the modulated display light can extract information that is encoded in light emitted from a display. If the backlight modulation is different for different locations across an active area of a display, the instrument or another system in communication therewith can estimate the position of the instrument relative to the display based on the modulation received by the instrument (and the relative intensities of the modulated light if multiple modulation codes are received during a single frame).

In order to receive and decode the modulated light, the instrument includes an optical interface (e.g., an aperture, lens, or light guide oriented to receive light from the display) and one or more photodetectors (e.g., a photodiode, phototransistor, imager, image sensor, or other sort of light sensor). The photodetector is responsive to light energy emitted by the backlight, which may include invisible wavelengths such as infrared. The photodetector may be sufficiently sensitive and fast-acting to support demodulation of the data streams. Although the photodetector system can be a camera imager, estimation of angle and distance may be performed based on light received by a simple photodiode or similar low-resolution, low-cost optical detector system. A low-resolution optical detector system can operate from continuous low power, which may be lower than an amount of power consumed by a camera imager. Demodulation can be performed by dedicated electronic hardware, dedicated software, or by a mixture of hardware and software, for example, based on a microcontroller receiving signals from one or more photodetectors.

Figure 2A:
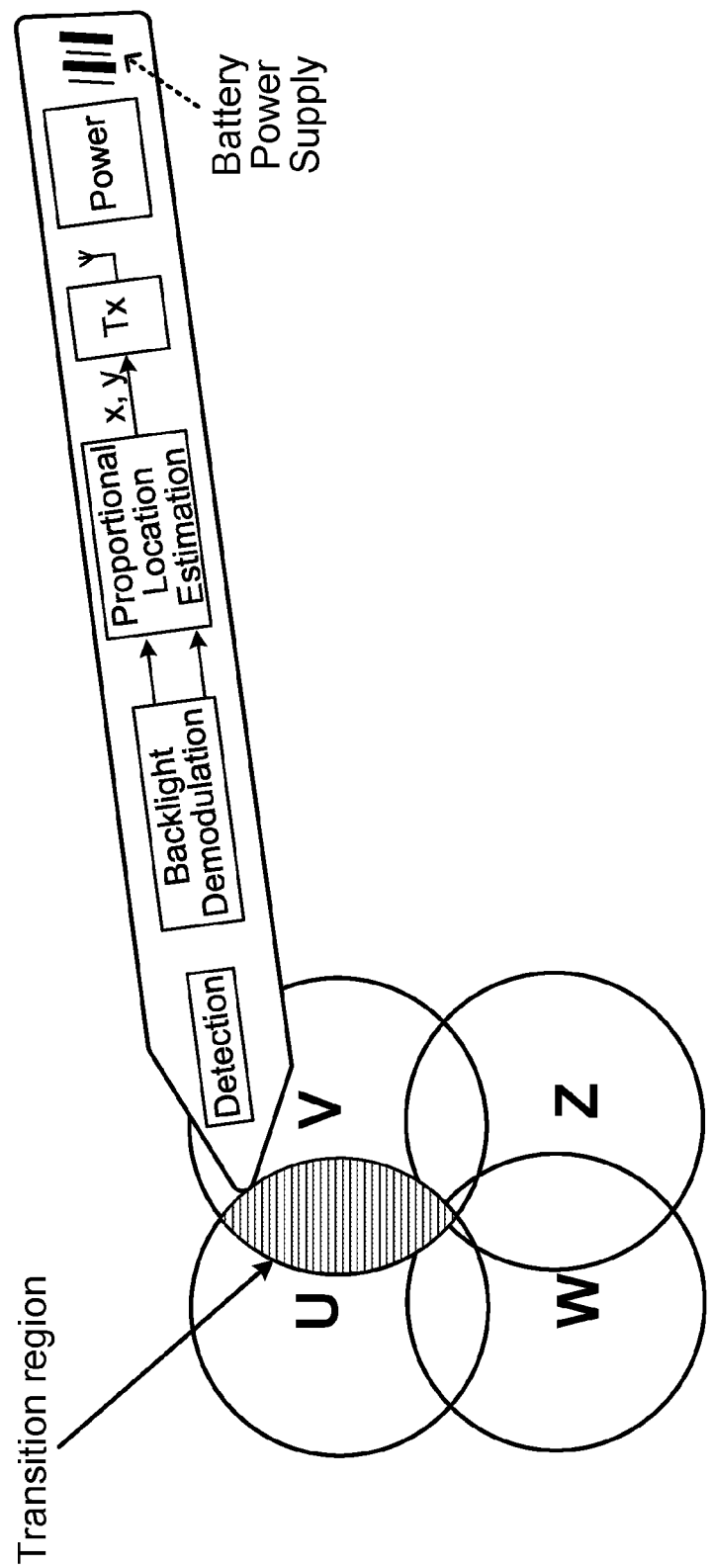
FIGS. 2A-B show a pen instrument that integrates a photo-detection system and associated demodulation and location-estimation subsystems into the pen instrument.
Figure 2B:
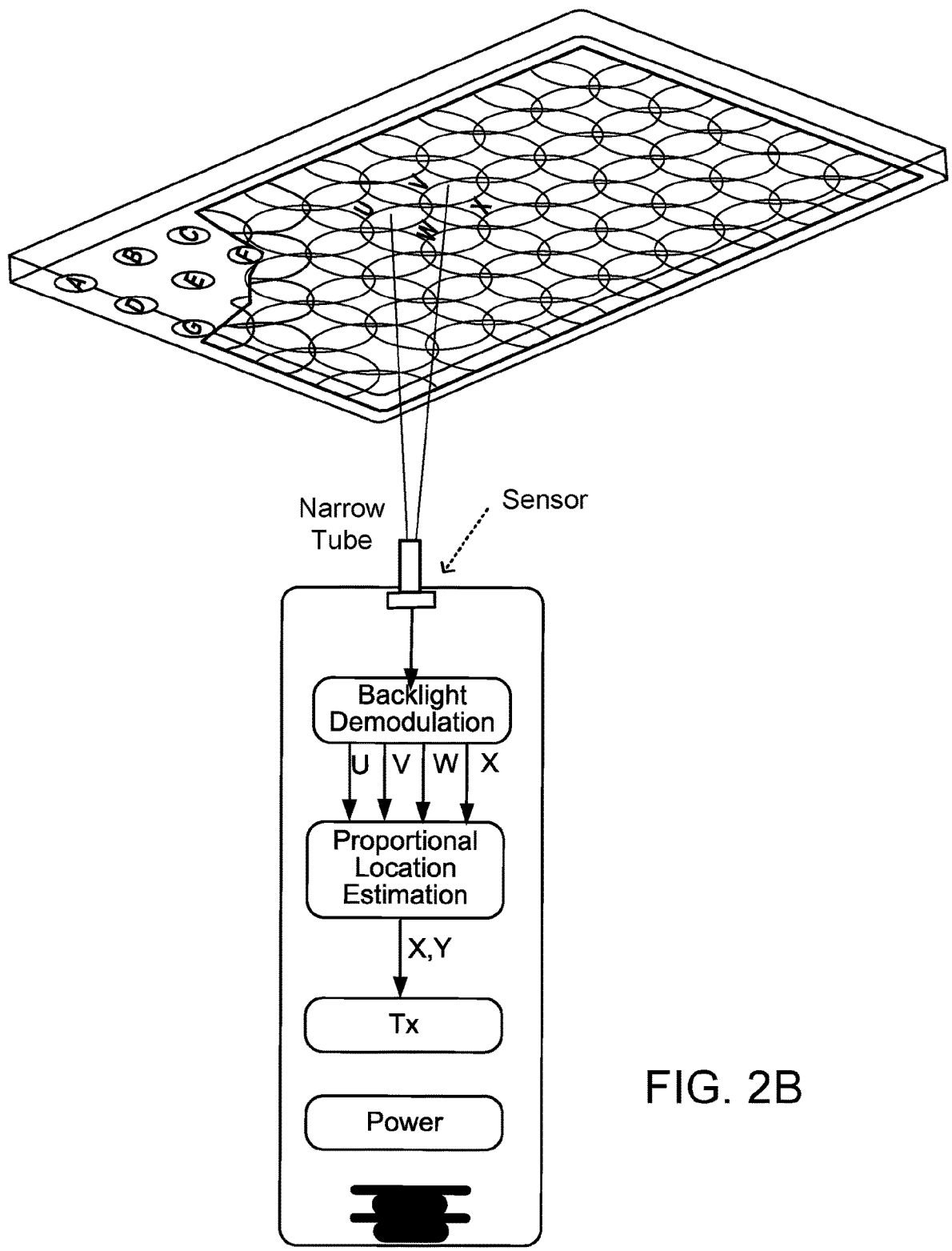

FIGS. 2A-B show a pen instrument that integrates a photo-detection system and associated demodulation and location-estimation subsystems into a pen instrument. Such a pen instrument can also include a wireless communication mechanism (labelled "Tx" in the figures) and a suitable battery power supply. Such an instrument can detect and decode modulated light data and estimate corresponding display-related locations based on received light signals. The pen instrument can then wirelessly communicate the location estimate to a host device that is directly or indirectly in control of the image presented by the display device, to cause a modification to the displayed image based on user interaction involving the pen instrument. The host device can include circuitry included in the display on which the pen instrument is writing, circuitry included in a dongle plugged into a port of the display, a bridge device located in the same room or building as the display and pen instrument, or a cloud computing system in direct or indirect communication with the pen instrument and the display.

This arrangement of system components allows a user to interact with the display system (e.g., drawing features, or activating or moving on-screen elements) with a familiar and untethered instrument, and with little or no cost encumbrance to the display system, since the ability to modulate the regions of the backlight individually may already be present in the display system. Such a pen instrument can be used for various kinds of user interaction, such as highlighting a portion of the display, adjusting control values, moving on-screen elements, and drawing a moveable spot on the display to simulate the effect of a laser pointer.

A pen instrument can be implemented using one or more photodetectors configured to receive light over a narrow range of acceptance angles. This can be done using collimating lenses or reflectors, or by apertures, such as a long and narrow tube. Demodulation of the received light and interpolation processing of resulting demodulated signals can be used to determine at which area of the display the pen is pointed. As such, the pen instrument need not be placed in contact with the display, and instead can serve as a pointing instrument operated by a user remote from the display (e.g., at a distance of 1-5 meters in some configurations). As discussed above, a location-identifying system can be implemented with demodulation and location-estimation components in a pen instrument, although such components can be located at a host device.

A location-identifying system can estimate distance of the instrument to the display based on the portion of the display from which the instrument receives light (e.g., determined based on a quantity of codes decoded from the received light). For example, the angular span of modulated display light received by the instrument can be used to estimate the distance between the instrument and the display. For example, if an optical detector which is configured to receive light over a narrow angular range detects modulated light from many or all of the regions of the display, the instrument may be determined to be a considerable distance from the display. The number of display regions detected reduces as the instrument gets closer to the display.

Backlight Modulation and Diffusion

LCD backlights are sometimes divided into tens or hundreds of regions, and the duty cycle of the backlight LEDs in each region can be independently controlled to locally control image brightness. Example devices with local backlight dimming include the Sony XG95 LCD television and the MSI Creator 17 laptop computer (with 240 backlight regions).

To support instrument sensing, enhanced modulation can be applied to each backlight region with little or no additional material cost and with little or no visual disturbance to the user. This enhanced modulation can preserve the overall duty cycle of each backlight region while encoding unique and (optionally) dynamic data.

A diffusing system is commonly located between the backlight LEDs and the display panel in a television or other display device, where the diffusing system spreads the light so that light from one region blends with another in a gradual transition at the boundary between the regions (labelled as a transition region in FIGS. 1-2A). An optical detector in an instrument located at or near the surface of the display device can receive light from more than one adjacent backlight region, due to the light being blended together by the diffusing system. The decoding system can decode the combined modulated backlight, allowing a coarse instrument location to be determined based on the regional modulation detected, and a fine instrument location to be determined based on the relative intensities of the contributions from the nearby backlight regions.

In an example manufactured product, the Samsung QE55Q90TATXXU QLED 55" television backlight is divided into 120 regions (15 across by 8 down). The backlight diffusion means there are areas on the display surface of approximately 60 mm across over which the light is a diffuse mixture of light originating from adjacent backlight regions. The proportion of light contributed by adjacent backlight regions at any given point can be used to determine the position of the sensing instrument with respect to the various regions.

An instrument passing over the display surface may move quickly. For example, 3 m/s is a representative rate for a handheld instrument moving quickly over a large display, where the movement originates at the shoulder rather than the wrist or elbow. As such, the modulation scheme should accommodate demodulation and decoding based on such short-term exposure. Assuming a diffuse backlight region of approximately 50 mm in diameter and an instrument velocity of 3 m/s, the time window for exposure of the instrument to the modulated light may be approximately 17 milliseconds.

Continuously repeated presentation of a code with a duration of approximately 8 milliseconds can ensure that the receiving instrument captures at least one complete code burst within a 17 millisecond window. Should the receiving instrument be able to store partial code, the instrument may piece together a full code provided with a code repetition interval of less than 17 milliseconds. In such instance, the processing may accommodate any arbitrary phase relationship between code emission and the time window of the passing instrument.

Coding

Figure 3:
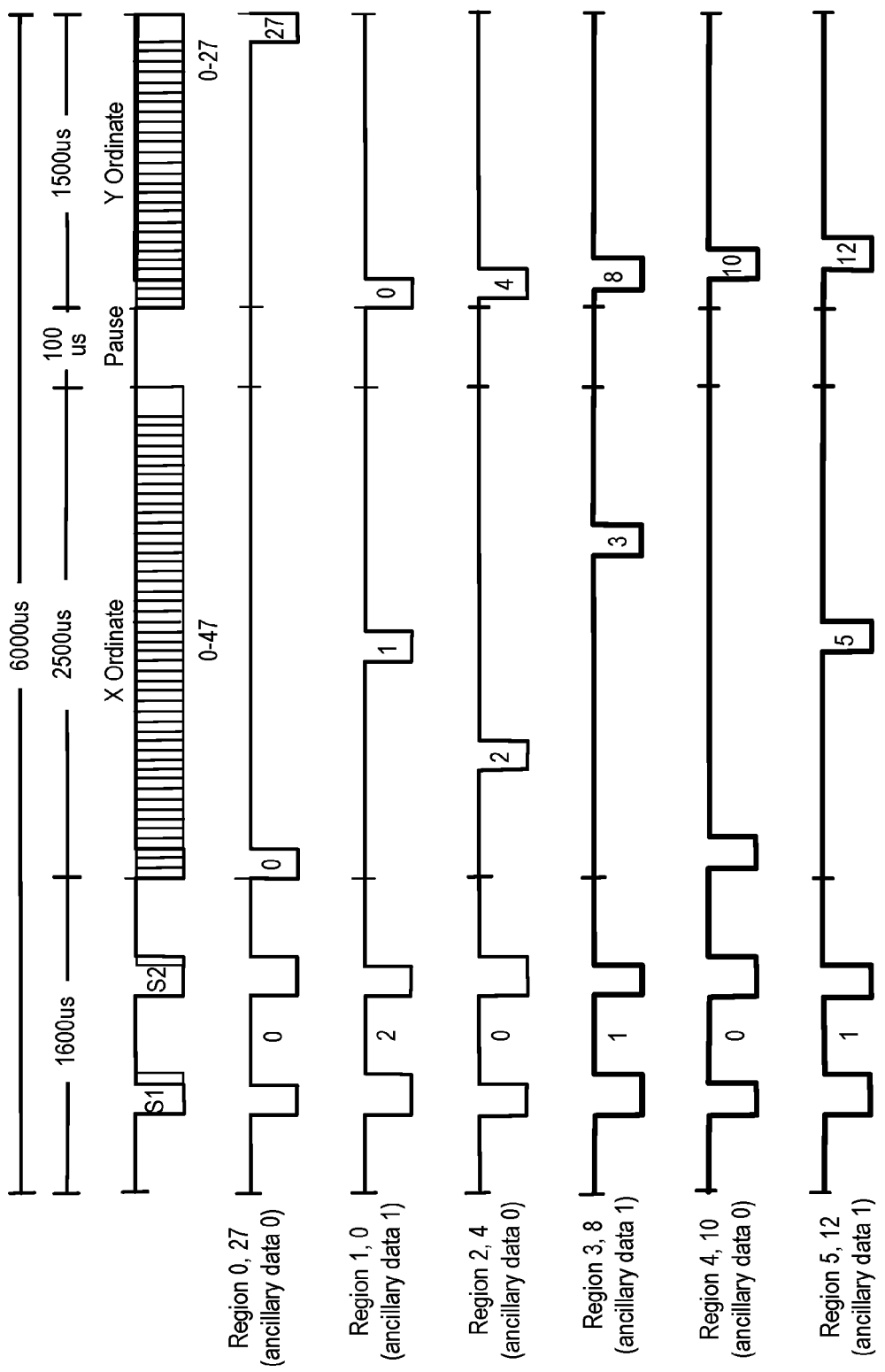
FIG. 3 shows an example timing diagram for a coding system.

The code modulated onto a backlight region can be unique within the physical extent of the display, including the diffuse transition between the backlight region and adjacent regions. Since the receiving instrument may capture several codes at a time, the codes should be fully separable. This can be accomplished using orthogonal modulation techniques such as Walsh functions, although a simple pulse for each code where each code is offset in time can be sufficient and is illustrated in FIG. 3.

Locally distinct codes ensure that an instrument close to the display surface will not have to accommodate much or any code leakage from elsewhere on the display. However, a globally unique code can be used to identify locations over the whole display area.

Aspects of a suitable coding scheme can include some of the following:
- Backlight duty-cycle is maintained (e.g., no human visible intensity modulation)
- Constant energy is used in all codes
    - Doing so preserves display brightness everywhere on the display
    - Doing so presents a constant loading to the power supply system
- Coding is suitable for detection with low-cost circuitry
    - Suitable coding may can provide a large depth of modulation
    - Suitable coding may not require an overly fast optical detector system
- Simultaneous reception of multiple equally energetic codes does not cause corruption of the location data
- Allows recovery time for the power system supplying the backlight regions
- Capable of providing a location estimate in a very short period of time (<200 ms), for example, because a pen instrument may move rapidly from the display border into the display active area and a quick processing enables the location on the display to be decoded rapidly.
- Associated with the display location only (with the optional ability to include global ancillary data), such that the modulation need not be responsive to the presence or location of instruments, so that any number of instruments can be used simultaneously with a single display.
- Simple decoding with minimal computational effort
    - Low power consumption for long battery life
    - Low cost of electronic components In addition to location data, modal and other information can also be communicated, for example, whether the display is in a mode which supports pen interaction, or the identification code for that particular display.

One example encoding scheme uses PPM (pulse position modulation) and constant energy PWM (pulse width modulation). Example encoding schemes may have one or more of the following attributes:
- Each frame conveys an X ordinate, a Y ordinate, and some ancillary data.
- Each frame is 6 ms long to accommodate fast-moving instruments.
- All backlight regions are modulated by frames of identical duration.
- All backlight region modulation frames start at the same time.
- There are 4 pulses (assumed to disable the backlight output) per frame.
- There is at least 400 us of inactivity between pulses
- Pulses are 150 us or 200 us in duration
- The total pulse duration in a frame is always 550 us.
- The first two pulses (S1 and S2) form a synchronization event.
- When S1 is 200 us long, S2 is 150 us long and vice-versa
- S1 and S2 can be modulated with ancillary data
- Ancillary data values are the same for all backlight regions
- A pulse indicates the X ordinate of the backlight.
- A pulse indicates the Y ordinate of the backlight.
- The ordinate values are encoded in the position of the pulse in time
- Pulse times for adjacent ordinate values do not overlap
- Pulse times for distant ordinate values can overlap but are unique Where X and Y ordinate pulses for adjacent backlight regions may not overlap, the energy received from each backlight region by a photodetector with a narrow view of the display surface can be measured independently (although it is possible to decode overlapping pulses, because the pulse intensity will increase where pulses overlap). A photodetector with a wide view of the display surface receives overlapping pulses, but the energy contribution can still be separated since there will be times when only one backlight region changes state (between on and off) so its energy contribution can be isolated. If this capability is required, the photo-detection system can have a corresponding short response time and a wide dynamic range.

FIG. 3 shows an example timing diagram for the coding system described above. The backlight output provided by each of six backlight regions is illustrated for a single frame of 6000 us length (each frame and the coded content therein repeats over a series of frames). In the first 1600 us synchronization period, each backlight region outputs S1 and S2 values with different lengths to encode ancillary data of 0 or 1. The following 2500 us period encodes the X ordinate, followed by a pause of 100 us, and followed by a 1500 us period that encodes the Y ordinate.

The example coding system discussed above gives a constant 5450 us/6000 us=90.83% duty cycle for the backlight. This may represent a display brightness which is higher than desired, so additional provision can be made to adjust the perceived display brightness while preserving the encoding scheme. For example, the current in the backlight system can be reduced using an adjustable current source. As another example, more instances of "off" time can be introduced, such as an additional period after the 6 ms code window during which the display backlight regions can be turned off or on, depending on the overall energy to be generated by each particular backlight region (e.g., based on user-selected overall brightness of the display).

Use of S1 and S2 pulses to detect and synchronize the decoding process enables the position-detecting electronics/software to ignore backlight activity after a certain period of time (e.g., after expiration of the 4.4 ms time period that follows the S1 and S2 synchronization pattern, as long as the backlight activity does not replicate the synchronization pattern. As another example, the length of the pulses that encode the X and Y ordinates can be changed to change overall display intensity, should the pulses be identifiable by their starting position independent of their length.

In the example coding system, pulses S1 and S2 are of complementary duration, so that data can be encoded on the pulse pair without affecting the overall light energy in the modulated frame. Example additional data that can be encoded during the synchronization period include an identity code for the display device, parametric data such as the range of X and Y ordinates supported, and modal information (e.g., whether the display is entering a low-power state). A series of frames can be used to communicate multi-bit data. The use of distinctive preamble patterns and synchronization words embedded in the data can be used to align the received data with a predetermined message format. Checking codes such as CRCs or checksums can be used to verify the code contents and alignment.

In some examples, the receiving instrument or processing system of the host device that performs the demodulation receives display timing signals that indicate a start of a backlight modulation frame (e.g., transmitted by the display via a traditionally wireless communication system such as Bluetooth or WiFi). In such examples, the display backlight modulation may not include a synchronization period because the receiving instrument may receive a signal indicating the start of each frame, and therefore may be able to determine the position of each pulse within the frame without a synchronization period.

Decoding and Location Estimation

An instrument equipped with a photodetector that is receptive to light from a small portion of the display surface can estimate the location of the photodetector system with respect to the display based on the backlight energy received by the photodetector. When only a single modulated backlight signal is detected, a center location of the corresponding backlight region can be used as the location estimate. When multiple modulated signals (e.g., separable ordinate pulses) are detected, an estimate of the energy in each signal can be used to interpolate a location estimate. For example, an analogue-to-digital converter can be used to determine the amplitude of the pulses received by the photodetector, and the resulting measured amplitude of each coordinate can be used as a weighting factor to identify the selected location with respect to the center of the backlight regions that correspond to the detected codes. The resulting weighted average X and Y values for all received backlight regions provide an interpolated location estimate.

Similar methods can be used for photodetector systems receptive over a larger proportion of the display surface, and in this case, modification of the weighting values based on the image brightness and color of the LCD panel that covers the LED backlight can improve the accuracy of the estimate. Where the pixels in front of a given backlight region are dark, the weighting for that region in the location estimator can be increased proportionally to compensate for the light attenuation in the pixel matrix.

The backlight regions themselves can also have different light intensities owing to natural variation in optical efficiency, or caused by system control activity intended to modify the local image brightness and power dissipation. Knowledge of these variations can be used to compensate for the effect they may have on modulated backlight signals, by adjusting the weighting factors for the backlight regions being combined in the location estimator. Backlight regions which are dim sources, or have been attenuated by the pixel matrix, can be more heavily weighted in the location estimator unless the signal-to-noise ratio of their contribution is too low.

Multiple photodetectors can be combined into a single signal to be processed by a single location estimator, or they can be processed by individual location estimators and the resulting estimated locations combined into an overall location estimate. This can be done using an averaging method.

Content of Displayed Image

A simplified location-detection mechanism involves determining the location of an instrument with respect to a surface of a display when the display is showing all white pixels (e.g., the LCD panel is displaying all white pixels), because the display pixel matrix will not have a significant effect on the backlight output over the display when displaying all white. However, in normal use, the display may have content other than white, which can result in non-uniform backlight intensity over the display. By inspecting a buffer (e.g., a frame buffer in the graphic system driving the display), an effect of the display matrix on the backlight regions can be estimated so that an expected illumination profile (intensity and color versus time) can be mapped to the entire display surface, or parts thereof.

As long as the light from a given backlight region or set of regions is receivable with sufficient signal-to-noise ratio at a photodetector in an instrument, the encoding of that backlight region or set of regions can be recovered. Expected illumination profiles at the display surface can be used to apply weighting factors to backlight regions to avoid bias. Without this weighting, location estimates can become biased towards portions of an image with bright pixel values. Expected illumination profiles can also be used to verify a location estimate. If the difference between the detected and expected values is large, the estimate can be deemed to be unreliable.

Once an approximate location estimate has been determined, the pixel values in that area can be modified to improve the SNR of the demodulation and to minimize bias. This can be done by setting the pixel values to white over an area centered on the estimated location, for example.

Resolving an accurate location on the display without knowledge of the display contents can be done, for example, using an optical detection system with a narrow field of view. In such an example, the diffusely blended contributions of nearby backlight regions may pass through the same pixels on the display and be modified by the pixel matrix in the same way. Using the proportional intensity of the nearby backlight regions to estimate the instrument location may then still be valid, without knowledge of (or compensation for) the display contents.

The wider the field of view of a photodetector using a proportional energy location-estimation method, the greater affect that display pixel contents may have on location estimation. However, being receptive to backlight energy from a significant proportion of the display surface (either with a single wide-angle photodetector system, or with multiple photodetectors with a narrow-angle view) allows for an uneven distribution of modulated light to be compensated, improving location-estimation. For example, an instrument positioned on or near the display surface can be configured to have photodetectors which receive light from backlight regions encircling the instrument. While a narrow-angle photodetector observing a small area on the display surface may receive light only from a single backlight region and consequently offer only an approximate location estimate, having a wide optical coverage ensures more backlight regions are visible and that interpolation of the instrument location can be improved.

As noted, the image on the display may affect this interpolation by reducing the intensity of certain backlight regions. One configuration which avoids this, but also avoids the need to compensate for the displayed image is to use multiple narrow-angle photodetector systems. Each photodetector receives light through a sufficiently small area of the display surface that the effect of the pixel matrix contents on the backlight energy available in that area is common to all of the backlight sources. While a single location-estimation derived in this way may be affected by the number of available backlight regions contributing to the estimate, combining multiple similarly derived estimates from other similar photodetectors receptive to light from small areas on different parts of the display can reduce the mean error of the final location estimate.

Supplementary Location Estimation

Depending on the number of backlight regions, the diffuser design and the requirements of the system, an instrument placed at or near the display surface may be estimated based solely on the separable modulation of the backlight regions, as described above. In some cases, additional information may be used, and can be provided by an ancillary sensor (e.g., an accelerometer, compass, gyroscope, touch sensor, or other mechanism), or using other methods which enlist the display matrix itself.

For backlight data to be decoded across all portions of the display surface, either all areas of the display may provide a threshold brightness level (e.g., a minimum brightness level), or the photodetectors may be sensitive enough to demodulate light which has passed through darker areas of the display matrix. Once an approximate location for an instrument has been established, improved optical signal quality can be achieved by selectively adjusting display pixels in the approximate location to be transmissive to backlight energy in the path to the instrument photodetector or photodetectors. This can be done by any part of the system with the ability to influence the display pixel values (e.g., the host device GPU, CPU, or a subsystem within the display that is capable of modifying pixel values provided by a GPU or CPU). This action has the additional benefit of providing a visible response to the user that an instrument has been detected on the display.

Fast movement of an instrument relative to the display surface may result in missed codes and increased error in location estimates. Fusing backlight-driven location estimation with data from other sensors (e.g., one or more accelerometers) in or attached to the instrument can help overcome estimation errors and provide more accurate and frequent location reports. Conversely, slow movement can lead to error in location estimates in some implementations, since the light from backlight regions may not overlap everywhere, giving uncertainty regarding whether the instrument is centered within a backlight region or is slightly offset from the center of the backlight region (e.g., resulting in a "staircase" in diagonal drawn lines).

Accelerometer data can be combined with the imperfect estimated reports, replacing a jagged trajectory from the backlight estimation with a smooth trajectory if the accelerometer data represents linear movement. A measure of expected accuracy can be derived from the backlight energy distribution, because accuracy and resolution can be highest where light from one backlight region is diffusely blended with light from adjacent backlight regions, and accuracy and resolution can be lowest where light from only a single backlight region is available.

Accuracy estimation can be done in real time (e.g., based on the demodulated backlight signals) or read from a pre-generated mapping using knowledge of the modulated light distribution in the system. When an estimated instrument location is in an area of high expected accuracy, the reports can be labelled as reliable. As the instrument moves through areas of diminished expected accuracy, accelerometer data can be weighted more heavily in the location reports. Accelerometers suffer from drift owing to accumulated error, so the absolute reference provided by the backlight data is a helpful complementary data source.

Multiple Instruments

Multiple instruments such as those described above can be used on the same display at a time. This is because there may not be interaction between the instruments, as each can receive encoded light directly from the display and report the corresponding location over a wireless link to a host device.

Each instrument can have a unique identifier, and the unique identifier can be directly associated in the system with the location of the instrument. This is useful in allocating unique attributes to an instrument, such as a drawing a specific color or line width. Support for many instruments is a feature which can be difficult to support with known systems, such as EMR pens (e.g., those from Wacom).

Palm Rejection

Another benefit to using locally modulated backlights to drive instrument location sensing is that such a technology is robust to the presence of a hand holding the instrument. Optical pen sensors which use the interruption of light passing over the display surface (e.g., those from FlatFrog) are disrupted by the presence of a hand in the sensing area, for example, when a hand rests on the display surface. The ability to track the location of an instrument in the presence of a hand is often referred to as palm rejection and is particularly valuable when the display is in a partly or substantially horizontal orientation.

Headset Implementation

In another application, the type of sensing instrument described herein can be used to determine the orientation of a headset on a user, for example, so that a spatial audio soundscape can be mapped to the display to enhance the effect that a spatialized sound source appears to originate at a specific location on the screen. One or more photo-detection systems on the headset can demodulate light from the display area at which the headset is directed, and the system can use location-specific backlight coding to estimate the orientation and optionally the distance of the headset relative to the display. The disposition of the head relative to the display can be used to spatially encode sound associated with the displayed material to give the auditory impression that the sound originates from the display, or even a particular location on the display.

OLED Displays

While the methods described herein have been presented with regard to liquid crystal display technology, similar methods can be applied to OLED displays. Response times for OLED pixels are typically around 1 us, compared to LCD pixel response times which are measured in milliseconds, so it is possible to modulate luminosity of pixel regions on an OLED panel in a way which is similar to the combined output of (i) a backlight with local dimming and (ii) an LCD pixel matrix.

The human-perceived brightness and color of an OLED pixel can be set by the duty-cycle of the OLED pixel emitting elements (e.g., with each OLED pixel including three or four OLED sub-pixels, each including a single OLED element and corresponding circuitry). The code/ patterns encoded by OLED pixels separately communicate location and optional mode information to devices configured to receive and decode the emissions. An advantage to using OLED displays is that it may be easy to implement a larger number of regions across a display (e.g., potentially with each pixel emitting a different code), to form comparatively small regions and greater accuracy in location determination.

Figure 4:
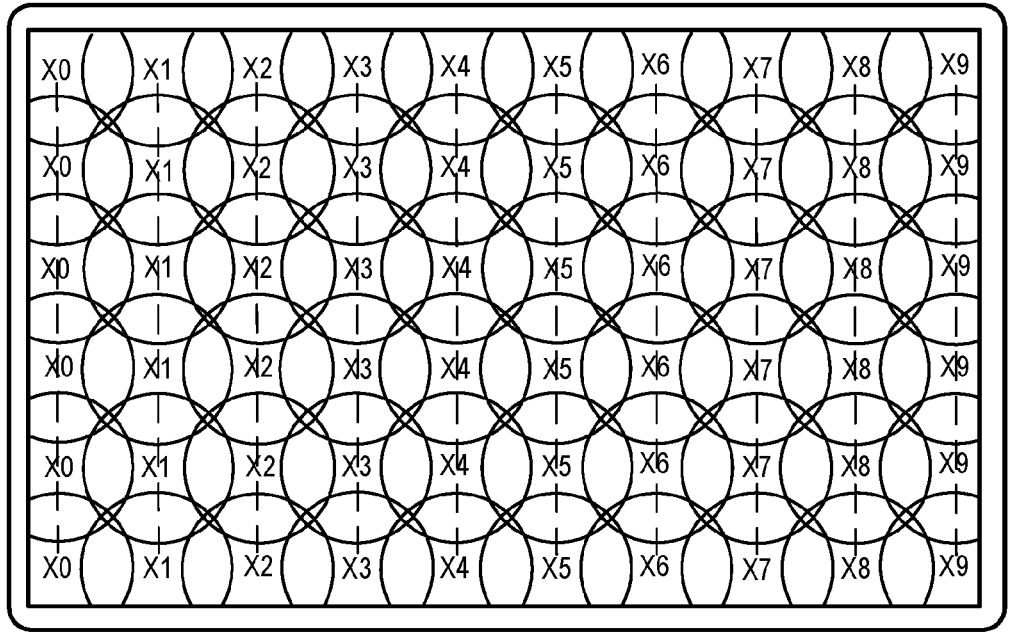
FIG. 4 shows an example distribution of ordinate modulation codes.
Figure 4:
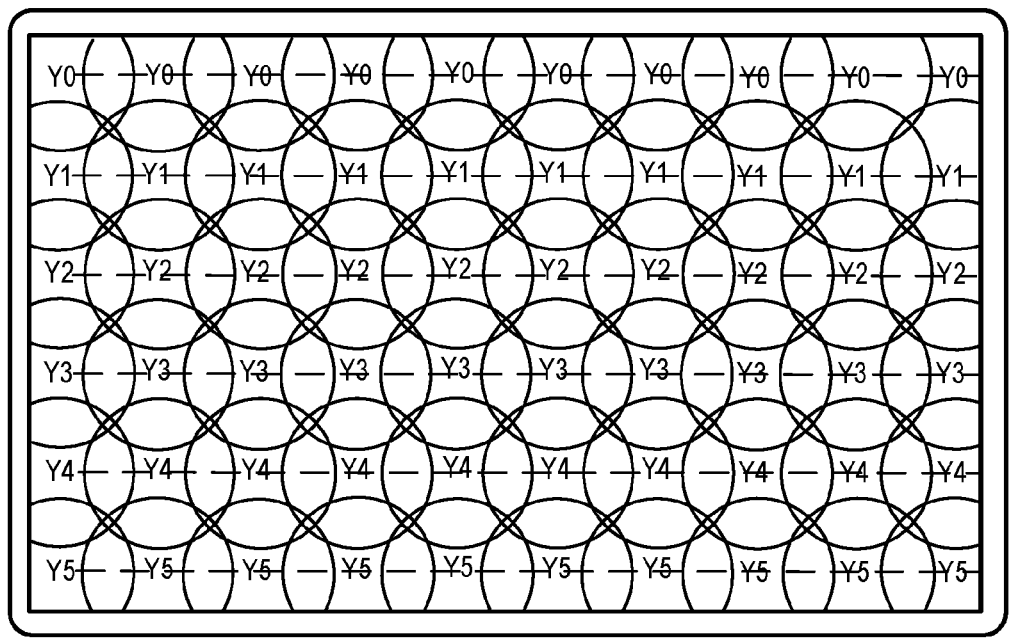

FIG. 4 shows an example distribution of ordinate modulation codes. An analogue-to-digital converter can be used to determine the amplitude of the pulses received by the photodetector, and the resulting measured amplitude of each backlight region contributing to the detected signal can be used as a weighting factor to identify the selected location with respect to the center of the backlight regions corresponding to the detected codes.

Where there are separate modulations for X and Y ordinates (for example, using one time window for pulses representing locations on one axis and a separate time window for pulses representing locations on a second axis), the backlight regions can be modulated together in a first axis and then modulated together in a second axis. FIG. 4 shows an example of this, where a code Xn is modulated identically on each of the vertically aligned columns of backlight regions for the duration of the X modulation time window in a backlight modulation frame, and a code Yn is modulated identically on each horizontal row of backlight regions during the Y modulation time window.

Interpolation can be performed using the amplitudes of the detected modulations Xn and Xn+1 (and other X modulation codes if they are received at the photodetector) to estimate a location in the X axis. A Y-axis location can be estimated by interpolation of the amplitudes of detected modulations Yn and Yn+1 (and other Y modulation codes if they are received at the photodetector). In the example given, there would be 10 X codes and 6 Y codes, which can be more convenient than having 60 fully independent codes to be differentiated, one for each backlight region.

Figure 5A:
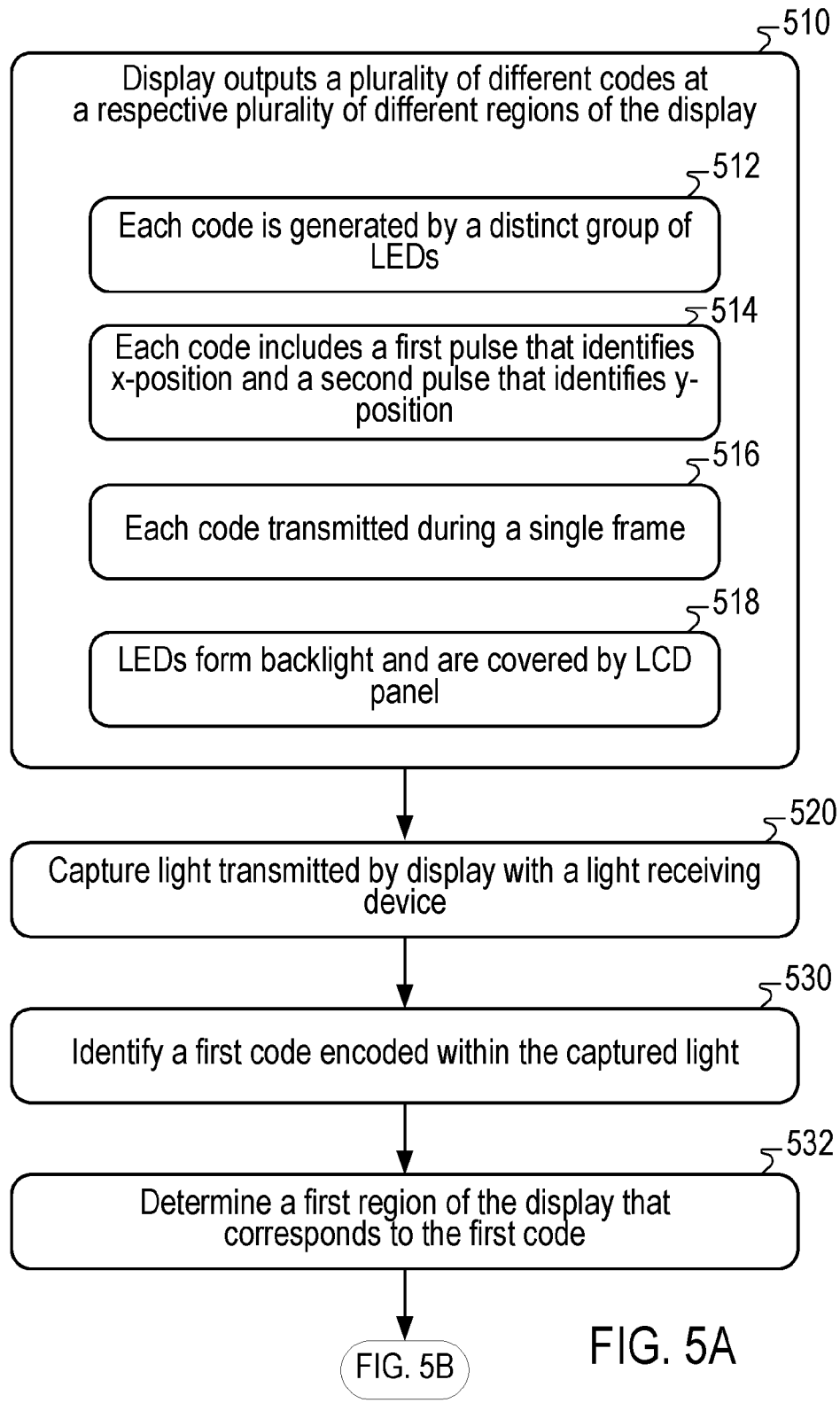
FIGS. 5A-B show a flowchart of a process for encoding and recognizing positions of a display.
Figure 5B:
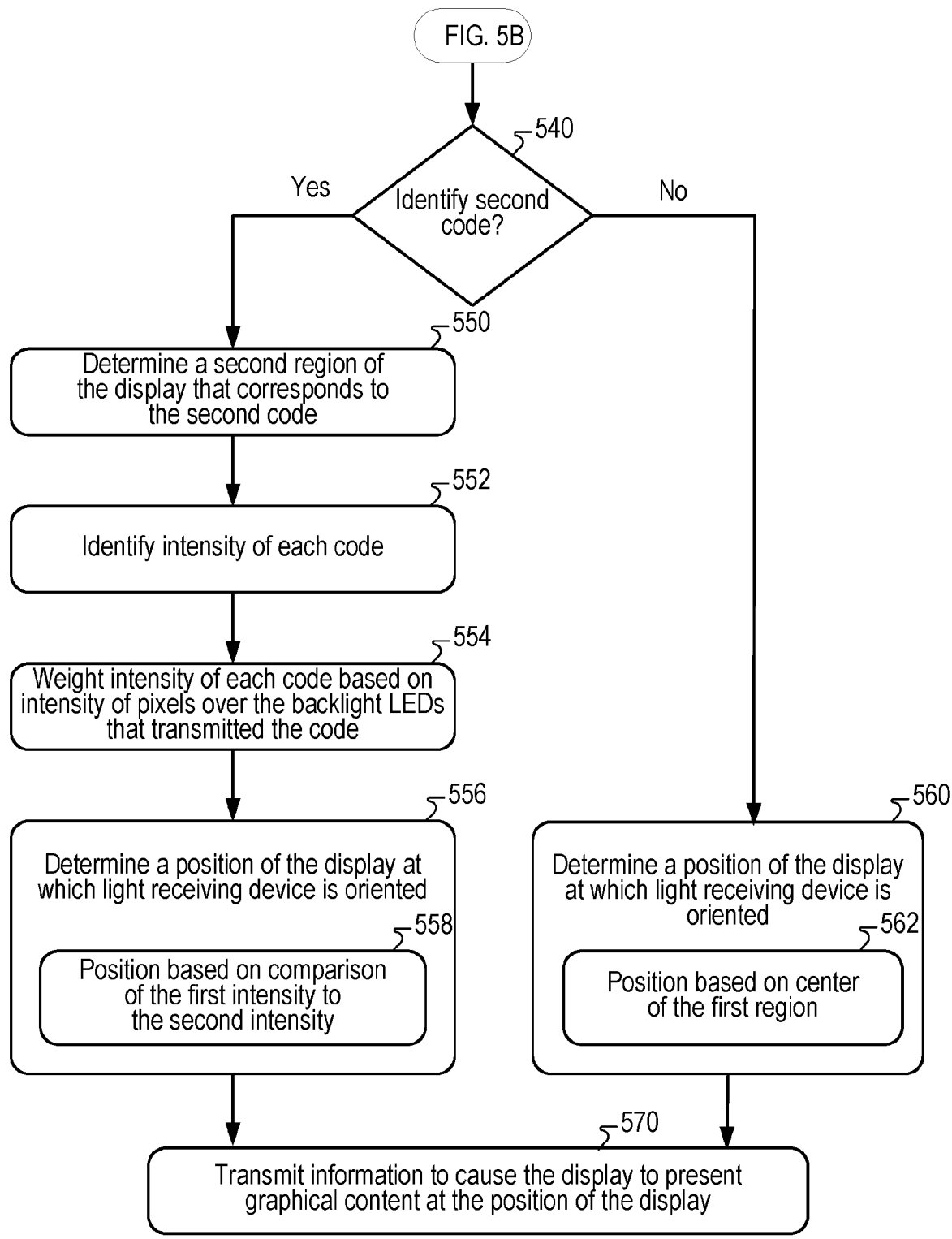

FIGS. 5A-B show a flowchart of an example process for encoding and recognizing positions of a display. In other words, to determine a position of a display at which a light receiving device is oriented (towards the display).

At box 510, a display outputs a plurality of different codes at a respective plurality of different regions of the display. Each code may be generated by a distinct group of LEDs (box 512). For example, the display may include a panel of LEDs, and that panel may be separated into a certain number of groups, which may be of the same size. FIG. 1 designates the groups of LEDs as groups A-G. Each group may include one or more LEDs. For example, a group may include a block of LEDs that is 8 LEDs across and 12 LEDs tall, for a total of 96 LEDs that emit the same pattern. Each group may emit a different/unique pattern.

As shown by the example timing diagram of FIG. 3, each block of LEDs may output a code that includes a first pulse that identifies an X-position of the block of LEDs and a second pulse that identifies a Y-position of the block of LEDs (box 514). Also as shown by the example timing diagram of FIG. 3, each code may be transmitted by its respective block of LEDs during a single frame (box 516). Each block of LEDs may output its respective code during each frame in a sequence of frames (e.g., a continuous presentation of frames, one after another).

The LEDs may be those of a backlight, and may be covered by an LCD panel (box 518). As such, the brightness of a visible region that corresponds to the block of LEDs from the perspective of a user viewing the display is based on a brightness of both (1) the LEDs from the respective block and (2) the darkness of the LCD pixels covering the block of LEDs. In some examples, the LEDs are part of an OLED display and there is no separate LCD panel that covers the LEDs.

At box 520, a light receiving device captures light transmitted by the display. For example, the pen that is illustrated in FIGS. 2A-B can include a photodetector that detects light transmitted by a certain portion of the display.

At box 530, a computing system identifies a first code that is encoded within the captured light. For example, computing components of the light receiving device and/or a host device in communication with the light receiving device can analyze the captured light to identify a code that is encoded within the received light. Identifying the first code can include identifying a synchronization event and then determining the location of pulses that follow the synchronization event.

At box 532, the computing system determines a first region of the display that corresponds to the first code. In this way, the position of the display at which the light receiving device is oriented can be determined. For example, the computing system can analyze a location of a first pulse that follows the synchronization event and correlate the location of the first pulse to an X-ordinate of the display, and analyze a location of a second pulse that follows the synchronization and correlate the location of the second pulse to a Y-ordinate of the display.

The process may further continue at box 540, where the computing system determines whether the captured light includes a second code. The second code may also be included within a single frame of the captured light, where each frame transmitted by the display may have a specified time and/or be separated by synchronization events. Multiple codes within a single frame of captured light can include multiple pulses during the X ordinate portion of the frame and multiple pulses during the Y ordinate portion of the frame. In some implementations, pulses may overlap, for example, where the captured light includes light from two regions that have a same X ordinate, potentially causing a pulse with at least a portion with an increased amplitude (e.g., twice the amplitude where the pulses overlap). The computing system can correlate X ordinate pulses to corresponding Y ordinate pulses, for example, pair a first X pulse with a second Y pulse and pair a second X pulse with a first Y pulse based on the first X pulse and the second Y pulse having corresponding/identical amplitudes and the second X pulse and the first Y pulse having corresponding/identical amplitudes.

In some examples, the first code and the second code may overlap in time. For example, the code for Region 0 (see FIG. 3) overlaps in time with the code from Region 1 (see FIG. 3), at least because the code for Region 0: (1) emits an X-Ordinate pulse before the code for Region 1 emits an X-Ordinate pulse, and (2) emits a Y-Ordinate pulse after the code for Region 1 emits a Y-Ordinate pulse.

At box 550, the computing system may determine a second region of the display that corresponds to the second code. For example, the computing system can analyze a location of a third pulse that follows the synchronization event and correlate the location of the third pulse to an X-ordinate of the display, and analyze a location of a fourth pulse that follows the synchronization and correlate the location of the fourth pulse to a Y-ordinate of the display. (The pulses are described herein as third and fourth pulses to distinguish such pulses from the above-described first and second pulses, even though it is likely that both the first and third pulses would occur before the second and fourth pulses.) It is possible that two pulses may be represented as a single pulse with an increased amplitude, due to the two pulses being transmitted at a same time by different groups of LEDs.

At box 552, the computing system may determine an intensity of each code. For example, the computing system determines an intensity of the first code and an intensity of the second code. FIG. 3 shows the transmission of codes by the display device, and thus each code has a same transmitted intensity. Captured light that includes multiple codes would likely represent each code with a different intensity due to the corresponding contribution of light differing for each block of LEDs. The intensity can be represented as an intensity of the pulse or the light transmission surrounding the pulse (e.g., the drop in intensity where the pulse is provided by an absence of light).

At box 554, the computing system may weight the intensity of each code based on the intensity of pixels over backlight LEDs that transmitted the code. For example, an identified intensity of a code that was transmitted by a block of LEDs behind a dark region of the display may need to be increased in weight to compensate for the dark region of the display blocking light transmission. This operation compensates received brightness for overlying LCD pixel values to negate effects of the LCD pixel value so that the brightness of LED groups may be compared to each other to determine relative intensities of multiple codes received by the light receiving device.

At box 556, the computing system may determine a position of the display at which the light receiving device is oriented. This position can be determined by identifying the codes from which light was received, identifying a location half-way between the regions to which the codes correspond, and then adjusting that location based on a comparison of the intensity of the first code to the intensity of the second code (box 558). For example, should the first code have a greater intensity than the second code (e.g., after the intensities have been weighted based on pixel intensity), the determined position may be a proportional amount closer to a center of the first region than a center of the second region. The operations of box 556 can determine the position based on more than two identified codes, for example, based on weighting intensities of three, four, five, or even more codes.

In examples in which only a single code is identified, the computing system may determine the position of the display at which the light receiving device is oriented as a center of the position.

At box 560, should the computing system not identify a second code in the captured light (in the optional processing of FIG. 5B), the position of the display at which the light receiving device can be determined. The position may be based on a center of the first region (box 562). For example, the position may be the center of the first region.

Both the position determinations of boxes 556 and 560 can account for signals from an additional one or more sensors, for example, data from an accelerometer, as discussed earlier in this description.

At box 570, the computing system may transmit information to cause the display to present graphical content at the determined position of the display. For example, the host device may transmit information to the display to cause the display to draw at the determined position. Combined with multiple iterations of the process shown in the flowchart of FIGS. 5A-B, the display may draw a curving line representing movement of the light receiving device.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 6:
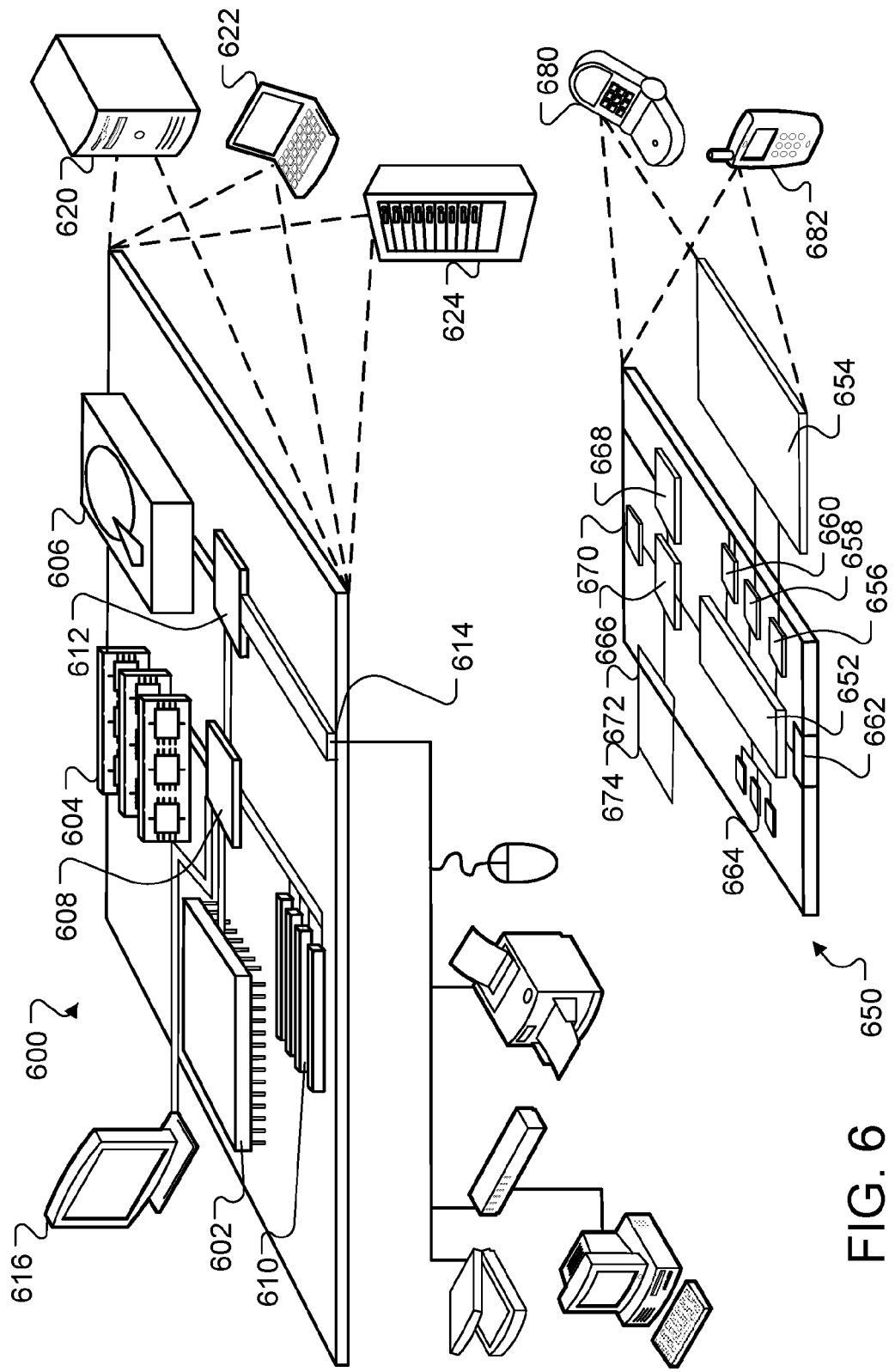
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 600 includes a processor 602, memory 604, a storage device 606, a high-speed controller 608 connecting to memory 604 and high-speed expansion ports 610, and a low speed controller 612 connecting to low speed expansion port 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed controller 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low speed controller 612 manages lower bandwidth-intensive operations. Such allocation of functions is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provided, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method to determine a position of a display at which a light receiving device is oriented, comprising:
    capturing, by the light receiving device, light transmitted by the display, wherein the display is configured to emit a plurality of different codes from a respective plurality of different regions of the display that are arranged into rows of regions and columns of regions, during each frame in a series of frames presented by the display, with each code of the plurality of different codes including a single pulse that is transmitted during a first portion of the respective frame and that indicates a vertical column of the respective region and a single pulse that is transmitted during a second portion of the respective frame that is offset from the first portion of the respective frame and that indicates a horizontal row of the respective region, such that each region of the plurality of different regions emits a globally unique two-pulse location-identifying code from among the plurality of different codes during each respective frame;
    identifying, by a computing system, a first code encoded within the light transmitted by the display and captured by the light receiving device during presentation of a particular frame by the display, the first code produced by a first group of one or more light emitting diodes (LEDs) of the display and including a first single pulse representing a first vertical column of regions and a first single pulse representing a first horizontal row of regions;
    determining, by the computing system, a first region of the display that corresponds to the first code from among the plurality of different regions of the display, based on the first region being located in the first vertical column of regions and the first horizontal row of regions;
    identifying, by the computing system, a second code encoded within the light transmitted by the display and captured by the light receiving device during presentation of the particular frame by the display, the second code produced by a second group of one or more LEDS and including a second single pulse representing a second vertical column of regions and a second single pulse representing a second horizontal row of regions;

determining, by the computing system, a second region of the display that corresponds to the second code from among the plurality of different regions of the display, based on the second region being located in the second vertical column of regions and the second horizontal row of regions;

identifying, by the computing system, a first intensity of the first code;

identifying, by the computing system, a second intensity of the second code; and determining, by the computing system, the position of the display at which the light receiving device is oriented based on a comparison of the first intensity of the first code with respect to the second intensity of the second code.

2. The computer-implemented method of claim 1, wherein:

the first group of one or more LEDs that produce the first code are LEDs from a backlight of the display;

the second group of one or more LEDs that produce the second code are LEDs from the backlight of the display;

a liquid crystal display (LCD) panel covers the backlight of the display; and the method comprises, before determining the position of the display at which the light receiving device is oriented based on the comparison of the first intensity of the first code with respect to the second intensity of the second code:

weighting the first intensity of the first code based on an intensity of LCD elements within the first region of the display, the LCD elements within the first region of the display covering the first group of one or more LEDs of the backlight; and weighting the second intensity of the second code based on an intensity of LCD elements within the second region of the display, the LCD elements within the second region of the display covering the second group of one or more LEDs of the backlight.

3. The computer-implemented method of claim 1, wherein:

the light that encodes the first code and the second code is light transmitted during a single frame of display backlight modulation; and the first code and the second code overlap in time.

4. The computer-implemented method of claim 1, wherein:

a single photodetector of the light receiving device captured the light that encodes both the first code and the second code.

5. The computer-implemented method of claim 1, wherein:

the computing system determines the position of the display at which the light receiving device is oriented using data from an accelerometer that indicates a direction in which the light receiving device has been moving.

6. The computer-implemented method of claim 1, comprising:

transmitting, by the computing system, information to cause the display to present graphical content at the position of the display at which the light receiving device is oriented, to indicate selection by the light receiving device of the position of the display.

7. The computer-implemented method of claim 1, wherein:

the first single pulse that represents the first vertical column identifies a first X-position of the display and the first single pulse that represents the first horizontal row identifies a first Y-position of the display; and the second single pulse that represents the second vertical column identifies a second X-position of the display and the second single pulse that represents the second horizontal column identifies a second Y-position of the display.

8. The computer-implemented method of claim 7, wherein:

a starting location of the first single pulse that represents the first vertical column identifies the first X-position of the display;

a starting location of the first single pulse that represents the first horizontal row identifies the first Y-position of the display;

a starting location of the second single pulse that represents the second vertical column identifies the second X-position of the display; and a starting location of the second single pulse that represents the second horizontal row identifies the second Y-position of the display.

9. The computer-implemented method of claim 1, wherein:

the first code includes a first serial pattern of two pulses; and the second code includes a second serial pattern of two pulses.

10. The computer-implemented method of claim 1, comprising:

outputting, by the display, the plurality of different codes from the respective plurality of different regions of the display, including:

the first group of one or more LEDs transmitting the first code as a first serial pattern of two pulses during each frame of a sequence of frames; and the second group of one or more LEDs transmitting the second code as a second serial pattern of two pulses, the second group of one or more LEDs being distinct from the first group of LEDs during each frame of the sequence of frames.

11. The computer-implemented method of claim 1, wherein:

the first group of one or more LEDs produce the first single pulse representing the first vertical column and the first single pulse representing the first horizontal column using a same color of light; and the second group of one or more LEDs produce the second single pulse representing the second vertical column and the second single pulse representing the second horizontal column using the same color of light.

12. A computing system configured to determine a position of a display at which a light receiving device is oriented, comprising:

one or more processors; and one or more computer-readable devices including instructions that, when executed by the one or more processors, cause the computing system to perform operations that comprise:

capturing, by the light receiving device, light transmitted by the display, wherein the display is configured to emit a plurality of different codes from a respective plurality of different regions of the display that are arranged into rows of regions and columns of regions, during each frame in a series of frames presented by the display, with each code of the plurality of different codes including a single pulse that is transmitted during a first portion of the respective frame and that indicates a vertical column of the respective region and a single pulse that is transmitted during a second portion of the respective frame that is offset from the first portion of the respective frame and that indicates a horizontal row of the respective region, such that each region of the plurality of different regions emits a globally unique two-pulse location-identifying code from among the plurality of different codes during each respective frame;

identifying, by the computing system, a first code encoded within the light transmitted by the display and captured by the light receiving device during presentation of a particular frame by the display, the first code produced by a first group of one or more light emitting diodes (LEDs) of the display and including a first single pulse representing a first vertical column of regions and a first single pulse representing a first horizontal row of regions;

determining, by the computing system, a first region of the display that corresponds to the first code from among the plurality of different regions of the display, based on the first region being located in the first vertical column of regions and the first horizontal row of regions;

identifying, by the computing system, a second code encoded within the light transmitted by the display and captured by the light receiving device during presentation of the particular frame by the display, the second code produced by a second group of one or more LEDS and including a second single pulse representing a second vertical column of regions and a second single pulse representing a second horizontal row of regions;

determining, by the computing system, a second region of the display that corresponds to the second code from among the plurality of different regions of the display, based on the second region being located in the second vertical column of regions and the second horizontal row of regions;

identifying, by the computing system, a first intensity of the first code;

identifying, by the computing system, a second intensity of the second code; and determining, by the computing system, the position of the display at which the light receiving device is oriented based on a comparison of the first intensity of the first code with respect to the second intensity of the second code.

* * * * *